Nov. 20, 1956 J. F. EBERLE 2,771,333
CONTAINER FOR DELIQUESCENT MATERIALS
Filed Oct. 16, 1951

INVENTOR.
J. F. EBERLE
BY
Hudson & Young
ATTORNEYS

United States Patent Office

2,771,333
Patented Nov. 20, 1956

2,771,333

CONTAINER FOR DELIQUESCENT MATERIALS

Jack F. Eberle, Bartlesville, Okla., assignor to Phillips Petroleum Company, a corporation of Delaware Application October 16, 1951, Serial No. 251,594

7 Claims. (Cl. 312—31)

This invention relates to improved containers for deliquescent materials, and in one specific aspect is particularly applicable to the storage of ammonium nitrate fertilizer.

Deliquescent materials, particularly those in the form of small crystals, often present numerous storage problems, inasmuch as they readily absorb moisture from the surrounding atmosphere, and thereby agglomerate into large lumps or cakes of difficulty manageable size. One such deliquescent material is ammonium nitrate in the form of small crystals, which is a valuable agricultural fertilizing agent and is employed in large quantities by agriculturalists to replenish the nitrogen extracted from the soil by commercially grown plants. As produced by most modern processes, ammonium nitrate fertilizer is in the form of fine crystals or prills, and accordingly presents serious agglomeration and caking problems, particularly when shipped or stored in commercial quantities.

In the manufacture of ammonium nitrate fertilizer, it is common practice to bag the product at somewhat above atmospheric temperature. At such a temperature, the fertilizer, which at atmospheric temperature would possess a relatively low moisture-vapor pressure, exhibits a relatively high moisture-vapor pressure. It has also been common practice to bag the product in multi-wall paper bags made up so that one or more of the layers are rendered relatively impervious to moisture. Since the moisture-impervious layers confine most of the moisture vapors in the bag, the moisture, upon the product's cooling to atmospheric temperature, tends to condense or be absorbed upon a relatively cool portion of the fertilizer, particularly near the bag walls. On storage of the fertilizer, this moisture tends to cement the particles of the fertilizer, particularly in the outer portions of the bagged product, forming a hard crust.

During the relatively short period of excessive temperatures, immediately after bagging the ammonium nitrate fertilizer product, the moisture impervious layers of the bag are fairly efficient in that most of the moisture is confined in the bag. However, under storage conditions over prolonged periods, the so-called impervious layers have proven to be only relatively impervious to moisture. In other words, after a time in storage, equilibrium will be established between the atmospheric and bag moisture vapor pressure, resulting in severe caking throughout the entire bag of fertilizer material.

My invention is concerned with a container means advantageously applied to the storage of deliquescent materials, such as ammonium nitrate crystals, over long periods which prevents caking or agglomeration of the stored material. The container of my invention is advantageously applied to the bagging of ammonium nitrate fertilizer product while existing at temperatures higher than atmospheric, and absorbs and permanently holds most of the moisture given up by the relatively hot fertilizer immediately subsequent to bagging, and substantially prevents an interchange of moisture between atmospher and the bagged fertilizer.

An object of this invention is to provide a container for deliquescent materials. Another object is to provide a container which prevents the contact of a material stored therein with moisture from the surrounding atmosphere. Another object is to provide a container particularly applicable in the bagging of ammonium nitrate fertilizer product. Another object is to provide a container which prevents moisture from entering same from the surrounding atmosphere and which is capable of absorbing in its side walls, moisture present in its contents. Other objects will be apparent to those skilled in the art in the light of accompanying discussion and disclosure.

In accordance with my invention I have provided as a new article of manufacture, a container or receptacle which in its broadest embodiment comprises at least one multi-walled section adapted to form an enclosed space, such a multi-walled section comprising a first and innermost wall pervious to moisure, a second wall in close spaced relation to the first wall and a third and outermost wall in close spaced relation to the second wall, a layer of moisture pervious desiccant intermediate the first and second walls, and a layer of a moisture barrier type desiccant intermediate the second and third walls. When desired one or more additional outer walls can be employed to give additional strength to the container as may be particularly desirable if it is to be moved frequently.

In a preferred form, the article of my invention comprises a fertilizer bag and is advantageously applied in the bagging of ammonium nitrate fertilizer product while still at temperatures above atmospheric, described above. In one form, the fertilizer bag article of my invention is formed by a first and innermost wall pervious to moisture, a second wall in close spaced relation to the first wall, i. e. wrapped around the first wall, and a third and outermost wall in close spaced relation to, or wrapped around, the second wall. A coating of a moisture absorbent desiccant is impregnated on the inner surface of the second wall, or on the outer surface of the first wall, or both, and a coating of a moisture barrier type desiccant is impregnated on the outer surface of the said second wall, or on the inner surface of the third wall, or both, and the third or outermost wall is a tough moisture resistant material serving primarily to impart strength to the bag so as to facilitate its handling in transit or in storage.

A preferred form of my invention is illustrated with reference to the attached drawings. It is to be understood that various modifications and changes can be made to the drawings and still remain within the intended scope of my invention.

Figure 1:
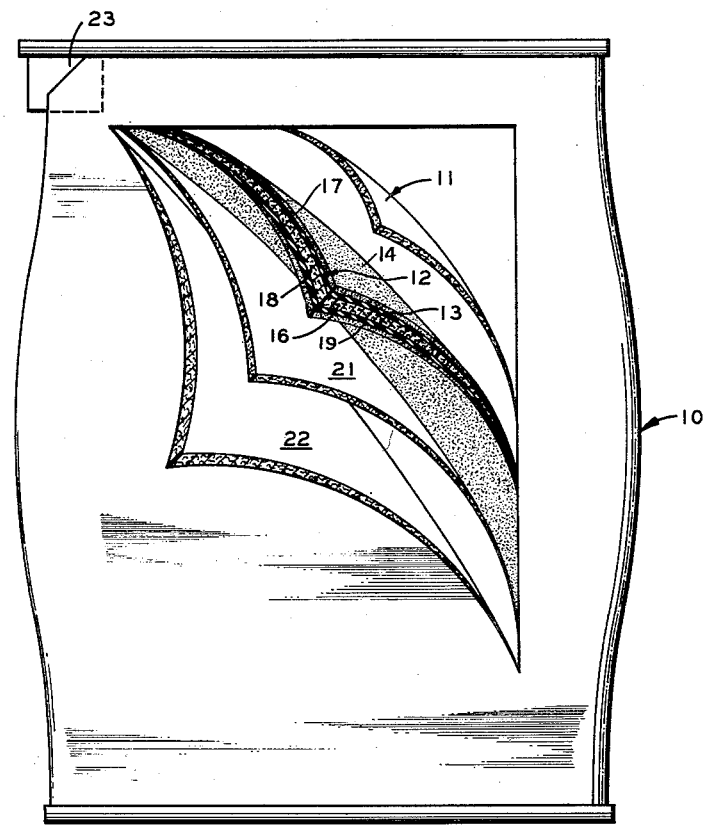
Figure 1 is illustrative of the multi-wall construction of a fertilizer bag particularly suitable for use in the bagging process described above.

With reference to Figure 1 fertilizer bag 10 is formed by a first and innermost wall 11 pervious to moisture, a second wall 12 in close spaced relation to wall 11, i. e. wrapped around wall 11 and coated with an adhesive material 13 such as an asphaltic or paraffinic coating on both its inner surface 14 and its outer surface 16. Moisture absorbing desiccant 17 is impregnated on coating 13 and is supported in position by adhesion to coating 13. The outer surface 16 of wall 12 is coated with an adhesive coating material 18 which can be an asphaltic or paraffinic coating similar to coating 13. A moisture barrier type desiccant 19 is impregnated upon coating 18 and supported in position by adhesion to coating 18. A third wall 21 is disposed about wall 12 in close spaced relation to wall 12 and is a moisture resistant tough material which imparts strength to the bag 10, i. e. resistance to tearing, break down and the like ordinarily encountered when the bag is filled, and in storage or in transit. Wall 22 of the same type material as wall 21 can also be employed if desired in conjunction with wall 21 to form a resulting two-ply moisture resistant outer layer.

Bag closure member 23 can be any suitable closure means, preferably a closure of the valve pack type.

Figure 2:
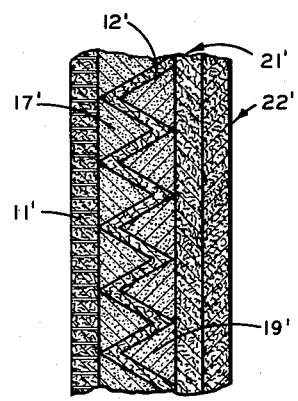
Figure 2 illustrates in detail another form of multi-wall construction that can be employed in the fabrication of a container of my invention.

Another embodiment of the multi-wall construction of my invention, is illustrated with reference to Figure 2. The container multi-wall of Figure 2 comprises innermost wall 11', a free layer of moisture absorbing desiccant 17' supported against wall 11' by corrugate wall 12', which itself forms a corrugated partition comparable to wall 12 (Figure 1) intermediate walls 11' and 21' or 21'—22', corrugate wall 12' supports moisture barrier type desiccant 19' intermediate walls 12' and 21'. This construction is particularly advantageous in that corrugated wall 12' prevents settling of desiccant materials to the bottom of the container which, if permitted, would result in a void space in an upper portion of the container and attainment of equilibrium of moisture in the bag with that in the surrounding atmosphere, which of course would be undesirable for the reasons already discussed. Corrugate wall 12' prevents such settling of the desiccant inasmuch as it provides for supporting numerous individual portions of the material in place. This support is all the more strengthened by the weight against the bag inner wall when filled with the deliquescent material.

As applied to the bagging of ammonium nitrate fertilizer containing moisture and while still at the temperature above atmospheric as described above, the container embodiment of Figure 1 is particularly advantageous inasmuch as the fertilizer at the time it is bagged has a relatively high moisture vapor pressure, and moisture therefrom passes through the moisture pervious layer 11 and is absorbed on desiccant 17, and held permanently thereon. By virtue not only of a relatively moisture resistant layer 21, or 21—22, but also by means of barrier type desiccant 19, entry of moisture from the surrounding atmosphere into the bag contents is prevented so that there is not an interchange of moisture between the atmosphere and the contents of the bag, which, if permitted to occur, would cause caking throughout the entire bag of the deliquescent material. Also, most of the moisture present in the hot fertilizer is given up immediately after bagging, through the moisture pervious wall, and permanently held on the absorbing desiccant.

In one manner in which a bag container of this invention (see Figure 1) is applied to the bagging of fertilizer, the relatively hot fertilizer is transferred into the container which at that time comprises wall 11, coating 13, moisture absorbing desiccant 17 impregnated on coating 13, and wall 12. The bagged material is then dipped in a paraffinic, asphalt or resin bath to thoroughly seal the bag and form adhesive layer 18. While this adhesive coating 18 is still warm, the bag is tumbled in a body of moisture barrier desiccant 19 to attain the desired thickness of desiccant layer 19. The fertilizer bagged in this manner is then wrapped in a tough outer layer of moisture resistant material 21 or 21—22, and the finished and filled container thus obtained is ready for storage or transit.

Included among the various moisture barrier desiccants employed in accordance with my invention are organophillic clays made by reacting a clay such as bentonite, a montmorillonite, a kaolinite, or an illite with an organic base containing 10 or more carbon atoms; and hydrophobic clays, such as those made by treating a kaolinite, a montmorillonite or an illite with organic or silicone materials which render the clay hydrophobic in physical properties. Examples of hydrophobic treating agents are stearic acid, paraffin, beeswax, petrolatum, synthetic resins, and the like. Other moisture barrier desiccants include plaster of Paris ($CaSO_4 \cdot \frac{1}{2}H_2O$), slake lime, $Ca(OH)_2$, dehydrated powdered limestone, and dolomite. I prefer the use of plaster of Paris, as a moisture barrier desiccant, particularly because of its mild dehydrating effect on the outer bag walls.

Included among the various moisture absorbing desiccants employed in accordance with my invention are anhydrous calcium sulfate, calcium oxide, silica-gel, anhydrous alumina, dehydrated bauxite, anhydrous calcium chloride and dehydrated clays, the anhydrous calcium sulfate being preferred, because of its high capacity for absorbing moisture.

Many modifications of this invention will be apparent to those skilled in the art upon study of the accompanying disclosure. Such modifications, being clearly apparent from this disclosure are believed to be within the spirit and scope of this invention.

I claim:

1. A fertilizer bag formed by a first and innermost wall pervious to moisture, a second wall in close spaced relation to said first wall and a third and outermost wall in close spaced relation to said second wall, an adhesive coating covering the inner surface and outer surface of said second wall, a moisture absorbing desiccant impregnated on, and supported by, said inner surface adhesive coating, and a moisture barrier type desiccant impregnated on, and supported by, said outer surface adhesive coating.

2. The article of claim 1 wherein said moisture absorbing desiccant is anhydrous calcium sulfate.

3. The article of claim 1 wherein said moisture barrier type desiccant is plaster of Paris ($CaSO_4 \cdot \frac{1}{2}H_2O$).

4. As a new article of manufacture a multi-walled container, the said multi-wall comprising a first and innermost wall pervious to moisture, a second wall in close spaced relation to said first wall, and a third and outermost wall in close spaced relation to said second wall, moisture absorbing desiccant disposed intermediate said first and second walls, and a moisture barrier desiccant intermediate said second and third walls and substantially coextensive therewith.

5. A fertilizer bag formed by a first and innermost wall pervious to moisture, a second wall in close spaced relation to said first wall, a moisture absorbing desiccant layer supported intermediate said first and second walls, a third and outermost wall in close spaced relation to said second wall, and a moisture barrier type desiccant layer supported intermediate said second and third walls and substantially coextensive therewith.

6. A fertilizer bag formed by a first and innermost wall, pervious to moisture, a second wall in close spaced relation to said first wall and a third and outermost wall in close spaced relation to said second wall, and a layer of a moisture absorbing desiccant supported against the inner surface of said second wall and a layer of a moisture barrier type desiccant supported against the outer surface of said second wall and substantially coextensive therewith.

7. An article of claim 6 wherein said second wall is corrugate and wherein each said desiccant material is supported against said second wall by an adjacent bag wall.

(References on following page)

References Cited in the file of this patent

UNITED STATES PATENTS

| | | |
|---|---|---|
| 848,960 | Braun | Apr. 2, 1907 |
| 1,871,419 | McKee | Aug. 9, 1932 |
| 2,084,296 | Eustis | June 15, 1937 |
| 2,114,623 | Bergstein | Apr. 19, 1938 |
| 2,214,997 | Guyer | Sept. 17, 1940 |
| 2,250,980 | Workman et al. | July 29, 1941 |
| 2,310,712 | Schmied | Feb. 9, 1943 |
| 2,368,140 | Johnson | Jan. 30, 1945 |
| 2,524,162 | Chavannes | Oct. 3, 1950 |
| 2,530,986 | Moses | Nov. 1, 1950 |

OTHER REFERENCES

Publication: Bemis Bro. Bag Co., 5100 Second Avenue, Brooklyn 32, New York. "A Book You Can Bank On, etc.," page 10.